(12) United States Patent
Kang

(10) Patent No.: US 11,560,082 B2
(45) Date of Patent: Jan. 24, 2023

(54) LEVELING CONTROL DEVICE FOR VEHICLE LAMP AND CONTROL METHOD HAVING AN ACCELERATION SENSOR AND SPEED SENSOR

(71) Applicant: HYUNDAI MOBIS Co., Ltd., Seoul (KR)

(72) Inventor: Ji Sung Kang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 58 days.

(21) Appl. No.: 17/137,856

(22) Filed: Dec. 30, 2020

(65) Prior Publication Data

US 2022/0144160 A1 May 12, 2022

(30) Foreign Application Priority Data

Nov. 11, 2020 (KR) .......................... 10-2020-0149785

(51) Int. Cl.
*B60Q 1/115* (2006.01)
*F21S 41/60* (2018.01)

(52) U.S. Cl.
CPC .............. *B60Q 1/115* (2013.01); *F21S 41/60* (2018.01); *B60Q 2200/30* (2013.01); *B60Q 2300/112* (2013.01); *B60Q 2300/116* (2013.01); *B60Q 2300/13* (2013.01)

(58) Field of Classification Search
CPC .............. B60Q 1/115; B60Q 2300/114; B60Q 2300/13; B60Q 2300/132; B60Q 2300/134; B60Q 2300/136
See application file for complete search history.

(56) References Cited

U.S. PATENT DOCUMENTS

| 8,820,986 B2 * | 9/2014 | Yamazaki ................ B60Q 1/10 362/465 |
| 10,596,954 B2 * | 3/2020 | Nakamura ............. B60Q 1/115 |
| 10,676,016 B2 | 6/2020 | Kasaba et al. |

(Continued)

FOREIGN PATENT DOCUMENTS

| EP | 3246205 | 11/2017 |
| JP | 5577080 | 8/2014 |

(Continued)

OTHER PUBLICATIONS

Extended European Search Report dated Jun. 30, 2021, in European Patent Application No. 20217771.3.

*Primary Examiner* — Robert J May
(74) *Attorney, Agent, or Firm* — H.C. Park & Associates, PLC

(57) ABSTRACT

The device includes at least one acceleration sensor provided to detect acceleration of a vehicle in at least one direction, a wheel speed sensor provided to detect a speed of a wheel, a lamp provided to emit light, a driving unit connected to the lamp to adjust a direction of light, and a controller configured to, when the vehicle is traveling, calculate a dynamic angle value of the vehicle with respect to a road surface while the vehicle is in acceleration or deceleration and calculate a first static angle value based on the dynamic angle value of the vehicle, and, when the vehicle is stopped, to calculate a second static angle value and a road slope value of a road on which the vehicle is positioned, and then control a direction of the light emitted forward of the lamp based on the first or the second static angle value.

11 Claims, 5 Drawing Sheets

(56) References Cited

U.S. PATENT DOCUMENTS

2012/0101692 A1   4/2012   Kasaba et al.
2019/0193623 A1   6/2019   Osada et al.

FOREIGN PATENT DOCUMENTS

| JP | 2016028924 | 6/2016 |
| JP | 6193928 | 9/2017 |
| KR | 10-2019-0006752 | 1/2019 |
| WO | 2016013419 | 1/2016 |

* cited by examiner ical direction. In the case where a vehicle's height changes, if light is emitted only in the predetermined direction, it is not possible to secure enough visibility, or glare may be caused to an opposing vehicle.

LEVELING CONTROL DEVICE FOR VEHICLE LAMP AND CONTROL METHOD HAVING AN ACCELERATION SENSOR AND SPEED SENSOR

CROSS-REFERENCE TO RELATED APPLICATION

This application claims priority from and the benefit of Korean Patent Application No. 10-2020-0149785, filed on Nov. 11, 2020, which is hereby incorporated by reference for all purposes as if set forth therein.

BACKGROUND

Field

Exemplary embodiments of the present disclosure relate to a leveling control device for a vehicle lamp and a control method thereof.

Discussion of the Background

A vehicle is equipped with lamps each having a lighting function to easily recognize an object located around the vehicle when traveling at night.

Among the lamps, a headlamp has an essential function of securing a driver's front field of view by emitting light in the same direction as a direction of travel of the vehicle when the vehicle travels at night or in a dark place such as a tunnel. In general, a headlamp is installed to emit light in a predetermined direction. In the case where a vehicle's height changes, if light is emitted only in the predetermined direction, it is not possible to secure enough visibility, or glare may be caused to an opposing vehicle.

To solve this problem, a technology has been introduced to determine the slope of the vehicle by installing a vehicle height sensor on the vehicle and to adjust the height of light emitted from the headlamp accordingly. However, in order to mount the vehicle height sensor on a vehicle body, many configurations such as a bracket, the vehicle height sensor, a chassis, an arm for transmitting a dynamic motion within the vehicle, a link, a link bracket, and the like are necessary. This requires a lot of time for design, increases the production cost, and increases the weight of the vehicle's body, which adversely affects fuel efficiency.

In order to solve the problem of the height sensor, control devices for determining the slope of a vehicle using an acceleration sensor have been developed. When the acceleration sensor is used, an error due to noise occurs. As such errors are accumulated while the vehicle travels, there is a problem that estimation of the slope of the vehicle becomes inaccurate.

The above information disclosed in this Background section is only for enhancement of understanding of the background of the invention and, therefore, it may contain information that does not constitute prior art.

SUMMARY

Exemplary embodiments of the present invention reduce a vehicle's design time by substituting a vehicle height sensor, which will cut down production costs and improve fuel efficiency by reducing the weight of a vehicle's body.

According to one or more exemplary embodiments of the invention prevents accumulated errors from extracting a slope of a vehicle by applying a new logic that continuously predicts the slope of the vehicle even while the vehicle travels.

According to one or more exemplary embodiments of the invention provides a leveling control device for a vehicle lamp, and the device includes at least one acceleration sensor provided to detect acceleration of a vehicle in at least one direction; a wheel speed sensor provided to detect a speed of a wheel of the vehicle; a lamp disposed to emit light to the surroundings of the vehicle; a driving unit connected to the lamp to adjust a direction of light emitted forward of the lamp; and a controller configured to, while the vehicle is traveling, calculate a dynamic angle value of the vehicle with respect to a road's surface using at least one acceleration sensor while the vehicle is in acceleration or deceleration, to calculate a first static angle value of the vehicle based on the dynamic angle value of the vehicle, and, while the vehicle is stopped, to calculate a second static angle value of the vehicle, using at least one acceleration sensor and a road slope value of a road on which the vehicle is positioned, and then to control a direction of the light emitted forward of the lamp based on the first static angle value or the second static angle value.

According to one or more exemplary embodiments of the invention provides a leveling control method for a vehicle lamp, and the method includes: a driving state determining operation for determining whether a vehicle is traveling or stopped using a wheel speed sensor; a calculating operation for, when it is determined that the vehicle is traveling, calculating a dynamic angle value of the vehicle with respect to a road's surface using an acceleration sensor while the vehicle is in acceleration or deceleration and calculating a first static angle value of the vehicle based on the dynamic angle value of the vehicle, and, while the vehicle is stopped, for calculating a second static angle value of the vehicle using the acceleration sensor and a road slope value of a road on which the vehicle is positioned, and then controlling a direction of light emitted forward of the lamp based on the first static angle value or the second static angle value; and a lamp adjusting operation for adjusting a position of light emitted from a lamp disposed at the vehicle based on the first static angle value or the second static angle value of the vehicle.

According to one or more exemplary embodiments of the invention, the leveling control device for a vehicle lamp and the control method thereof uses an acceleration sensor instead of a vehicle height sensor to measure a slope of the vehicle and thus has the effects of reducing the design time associated with installation of the vehicle height sensor, cutting down the production costs, and reducing the weight of the vehicle's body, thereby improving fuel efficiency.

In addition, the present disclosure has an effect of preventing the accumulation of errors due to noise generated when measuring a slope of the vehicle using an acceleration sensor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
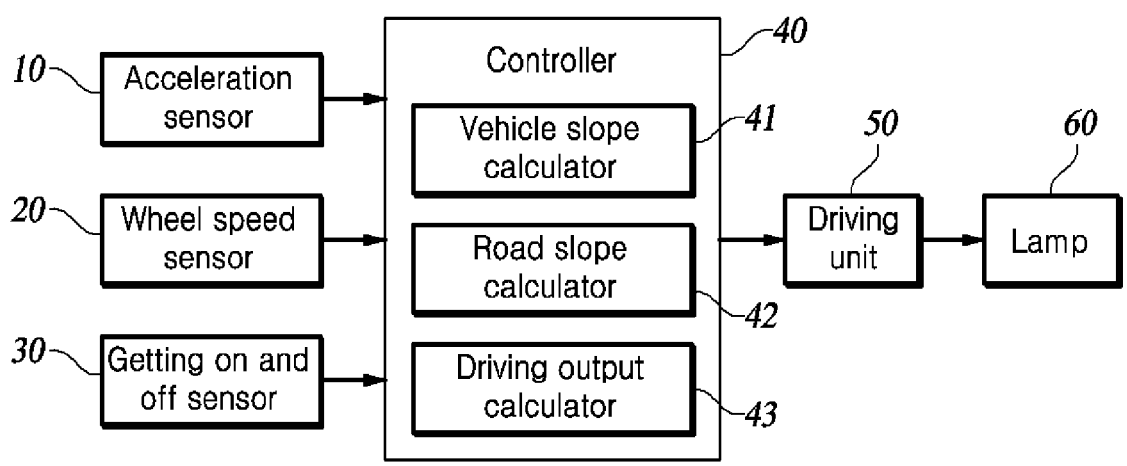
FIG. 1 is a block diagram of a leveling control device for a vehicle lamp according to an embodiment of the present disclosure.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Figure 2:
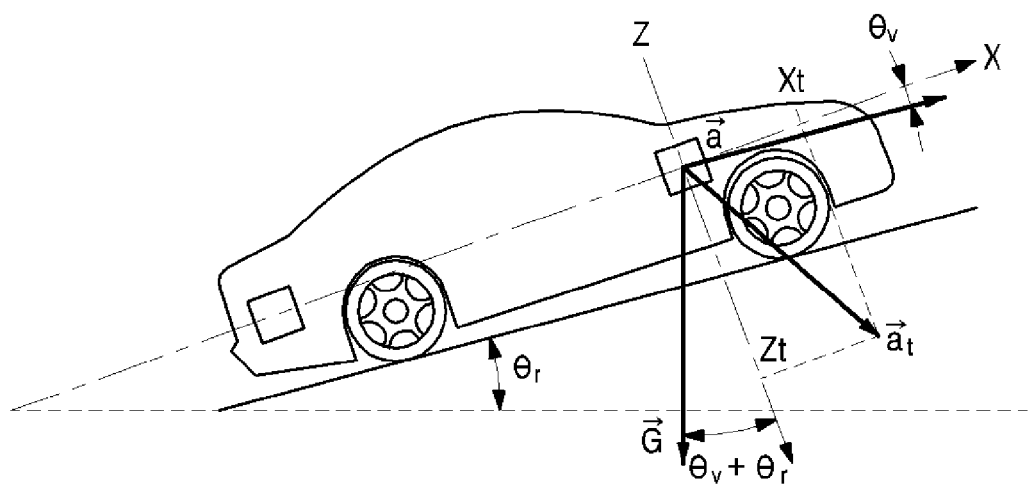
FIG. 2 is a diagram illustrating a process for calculating a first static angle value and a second static angle value of a vehicle.
Figure 3:
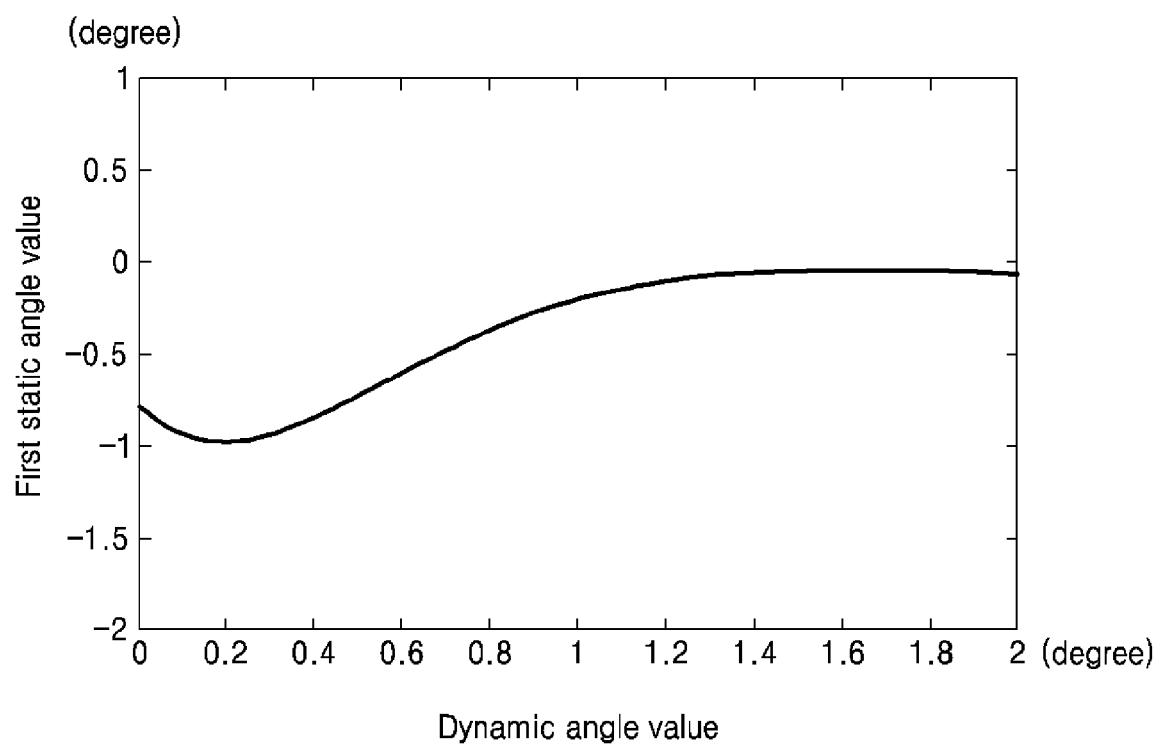
FIG. 3 is a graph illustrating a process for converting a dynamic angle value into a first static angle value according to an embodiment of the present disclosure.

FIG. 1 is a block diagram of a leveling control device for a vehicle lamp according to an embodiment of the present disclosure. FIG. 2 is a diagram illustrating a process for calculating a first static angle value and a second static angle value of a vehicle. FIG. 3 is a graph illustrating a process for converting a dynamic angle value into a first static angle value according to an embodiment of the present disclosure. In this case, the first static angle value may refer to a value of a slope of a vehicle with respect to a road surface while the vehicle travels, the second static angle value may refer to a value of a slope of a vehicle with respect to the road surface while the vehicle is stopped, and a final static angle value may refer to a median or average value of a plurality of effective first static angle values that are calculated by a controller 40 while the vehicle travels. The dynamic angle value may refer to the vehicle's tilt value formed in acceleration or deceleration while the vehicle travels.

In FIG. 1, a leveling control device for a vehicle lamp may include all or part of an acceleration sensor 10, a wheel speed sensor 20, a getting on and off sensor 30, a controller 40, a driving unit 50, and a lamp 60.

The acceleration sensor 10 may be disposed on the vehicle to detect acceleration of the vehicle in one or more directions. The acceleration sensor 10 may be a three-axis acceleration sensor having the X-axis, Y-axis, and Z-axis orthogonal to each other. The acceleration sensor 10 may be mounted on the vehicle and may detect an acceleration vector generated in the vehicle. While the vehicle travels, gravitational acceleration and kinetic acceleration may be generated due to the movement of the vehicle, and the acceleration sensor 10 may detect a composite acceleration vector $\vec{a}_t$ that is a combination of a gravitational acceleration vector $\vec{G}$ and a kinetic acceleration vector $\vec{a}$, as shown in FIG. 2. In addition, while the vehicle is stopped, the acceleration sensor 10 may detect the gravitational acceleration vector $\vec{G}$. The acceleration sensor 10 may transmit the detected value to the controller 40, and the controller 40 may transform the value received from the acceleration sensor 10 into longitudinal-axis, latitudinal-axis and vertical-axis components.

The wheel speed sensor 20 may be a sensor that detects the rotational speed of a wheel of the vehicle. The wheel speed sensor 20 may be disposed at each wheel of the vehicle to measure a speed of each wheel. The wheel speed sensor 20 may measure a rotational speed of a wheel of the vehicle and calculate a speed in a direction of travel of the vehicle based on the rotational speed of the wheel.

The getting on and off sensor 30 may detect whether a person or object gets on or off the vehicle. When a person or object gets on or off the vehicle, the position of the center of gravity of the vehicle may change, and since the slope of the vehicle itself changes, it is necessary to detect the person or object's getting on or off. The getting on and off sensor 30 may be a weight sensor disposed at a vehicle seat, a door opening and closing sensor for detecting the opening/closing of a door of the vehicle, a radar sensor capable of detecting a situation inside the vehicle, a camera sensor for each, and the like. The present disclosure has been described mainly about the door opening and closing sensor, but not limited thereto. In addition, the above-described configuration of the getting on and off sensor 30 is merely an example, and the present disclosure is not limited thereto and may include any configuration capable of detecting a person or object's getting on and off the vehicle.

The controller 40 may include all or part of a vehicle slope calculator 41, a road slope calculator 42, and a driving output calculator 43. The configuration of the controller 40 is classified for convenience of explanation of the functions of the controller 40 and does not necessarily have to be separately provided in the controller 40 as described above. In addition to the above-described configuration, the controller 40 may include memory and may be an Electronic Controller Unit (ECU) that controls not only the driving unit 50 and the lamp 60, but also the overall travel of the vehicle.

Based on signals received from the acceleration sensor 10, the wheel speed sensor 20, and the getting on and off sensor 30, the controller 40 may calculate one or more of a first static angle value, a second static angle value, and a final static angle value. In order to adjust an angle of light emitted from the lamp 60 using one or more of the first static angle value, the second static angle value, and the final static angle value, the controller 40 may calculate an output of the driving unit 50, which is disposed to adjust an emission angle of the lamp 60, and may control movement of the driving unit 50.

While the vehicle travels, the vehicle slope calculator 41 may calculate a dynamic angle value of the vehicle with respect to a road surface using the acceleration sensor 10 in the case where the vehicle is in acceleration or deceleration. The vehicle slope calculator 41 may calculate a dynamic angle value and then perform a process of calculating a first static angle value corresponding to the dynamic angle value. The dynamic angle value is affected by the inertia of the vehicle during acceleration or deceleration, thereby causing the vehicle to be inclined, and hence there is a difference in the angle of the vehicle when the vehicle is stopped and when the vehicle is traveling at a constant speed. Therefore, after the first static angle value of the vehicle, which is not affected by acceleration or deceleration of the vehicle, is calculated, the lamp 60 needs to be adjusted based on the first static angle value.

The dynamic angle value depending on acceleration or deceleration during traveling of the vehicle satisfies Equation 1. Each symbol will be described with reference to the drawing shown in FIG. 2.

$$\vec{a_t} = $$
$$(X_t, Z_t) = (\vec{a}\cos\theta_v - \vec{G}\sin(\theta_v + \theta_r), \vec{a}\cos\theta_v + \vec{G}\sin(\theta_v + \theta_r))$$
[Equation 1]

Here, $\theta_r$ is a slope of the road, $\theta_v$ is a dynamic angle value of the vehicle with respect to the road surface, $\vec{G}$ is gravitational acceleration, and $\vec{a}$ is acceleration of travel of the vehicle. $\vec{a_t}$ is a vector of summed acceleration of the vehicle, and Equation 1 expresses $X_t$ and $Z_t$ by decomposing the vector of summed acceleration of the vehicle on the basis of the X-axis and Z-axis shown in FIG. 2.

Equation 2 may be derived using Equation 1 to calculate $\theta_r$.

$$\theta_r = \sin^{-1}\left(\frac{X_t^2 + Z_t^2 - \vec{a}^2 - \vec{G}^2}{-2\vec{a}\vec{G}}\right)$$
[Equation 2]

After $\theta_r$ is calculated using Equation 2, a dynamic angle value $\theta_v$ may be obtained.

After the vehicle slope calculator 41 obtains the dynamic angle value, the vehicle slope calculator 41 may apply a dynamic-static angle transformation equation, which is obtained through a driving test, in order to transform the dynamic angle value into a first static angle value. The dynamic-static angle transformation equation may differ depending on the type of vehicle, and several driving tests are required depending on the type. In FIG. 3, a graph showing the first static angle value corresponding to the dynamic angle value is illustrated. This shows values obtained through an experiment. In the driving test, the dynamic angle value of a vehicle in acceleration or deceleration having a value equal to or less than a preset threshold is measured, the actual first static angle value of the vehicle is measured, and a correlation between the dynamic angle value and the first static angle value is shown as a graph. The graph shown in FIG. 3 shows the correlation between the dynamic angle value and the static angle value when an acceleration or deceleration value is constant, and a plurality of dynamic-static angle transformation equations may be made according to several acceleration or deceleration values. Each vehicle has a different dynamic-static angle transformation equation because the physical characteristics of each vehicle such as weight, size, and the center of gravity differ. The correlation between the dynamic angle value and the first static angle value may be stored in the form of a look-up table (LUT), instead of a transformation equation, and then transformed.

The vehicle slope calculator 41 may calculate and store the first static angle value at a regular time interval. In order to more accurately calculate the first static angle value, the vehicle slope calculator 41 may continuously calculate the first static angle value until a predetermined number or more of effective values are stored. However, when acceleration or deceleration of the vehicle exceeds a preset threshold, the calculated first static angle value may not be regarded as an effective value and thus not be stored. In excessive acceleration or deceleration, a dynamic angle value almost close to a maximum value may be measured regardless of an actual first static angle value, so this first static angle value may be regarded as noise and thus not be stored as an effective value. The vehicle slope calculator 41 may calculate a final static angle value based on stored effective values when a number of the stored effective values is equal to or greater than a preset effective number. Specifically, the vehicle slope calculator 41 may determine a median or average value of first static angle values corresponding to the effective values as the final static angle value.

When the vehicle is stopped, the road slope calculator 42 may calculate a road slope value of a road corresponding to the position of the stopped vehicle. Here, the road slope value may be a value representing a gradient of the road with respect to the ground surface. The road slope calculator 42 may calculate the road slope value by subtracting a first static angle value from an overall slope value measured using the acceleration sensor 10 and store the road slope value in memory. The vehicle slope calculator 41 may calculate a second static angle value based on the road slope value calculated by the road slope calculator 42. The second static angle value may be a value obtained by subtracting the road slope value from the overall slope value of the vehicle calculated using the acceleration sensor 10. The slope of the vehicle calculated using the acceleration sensor 10 may be a slope of the vehicle with respect to the ground surface rather than the road surface, and the slope of the vehicle may be calculated only when the road slope value is subtracted from the overall slope value of the vehicle. The controller 40 may use the wheel speed sensor 20 to determine whether the vehicle is stopped. When the vehicle's speed is equal to or less than a preset speed, it may be determined that the vehicle is stopped.

However, if a person gets on or off the vehicle, or an object is loaded into the vehicle, when the road slope calculator 42 calculates a road slope value while the vehicle is stopped, the second static angle value may change due to a change in the center of gravity of the vehicle. The present disclosure performs a logic to respond to the change.

When the vehicle is stopped, the road slope calculator 42 may calculate a road slope value in the case where a road slope value at a current position is not stored in memory. During a preset first time interval for calculating the road slope value, the getting on and off sensor 30 may detect whether a person or object gets on or off the vehicle. The road slope calculator 42 may use a first static angle value when calculating the road slope value. When a person or an object gets on or off the vehicle while the road slope value is calculated, the first static angle value calculated in advance may differ from the actual static angle value due to a difference in the center of gravity. Due to this difference, an incorrect road slope value may be calculated. Accordingly, the getting on and off sensor 30 may detect a person or object's getting on or off during the first time interval. When the getting on and off sensor 30 detects the person or object's getting on/off, a detection signal may be transmitted to the controller 40. When receiving the detection signal, the controller 40 does not calculate the road slope value using the first static angle value but may instead set the road slope value to a preset temporary value and store the road slope value in memory. Here, the preset temporary value may be 0 degrees. The reason for setting the road slope value to a preset temporary value (particularly, 0 degrees) is to prevent a situation that occurs due to miscalculation of the road slope value. Even if the road slope value is set to 0 degrees, the road slope value may be corrected later because the normal road slope value is calculated in the case of stopping after the next driving situation.

The controller 40 may calculate an output of the driving unit 50 connected to the lamp 60 using a static angle value, which is calculated using the road slope calculator 42 and the vehicle slope calculator 41. The driving unit 50 is configured to adjust a direction of light emitted from the lamp 60, and a vertical direction of the light emitted from the lamp 60 may be adjusted according to a driving degree. Therefore, a driving output calculator 43 provided in the controller 40 may calculate an angle at which the direction of light emitted from the lamp 60 should be adjusted based on the calculated first static angle value, the second static angle value, or the final static angle value, and may calculate an output of the driving unit 50 corresponding thereto. After the driving output calculator 43 calculates the output of the driving unit 50, the controller 40 may transmit a driving signal to the driving unit 50 to operate the driving unit 50.

Figure 4:
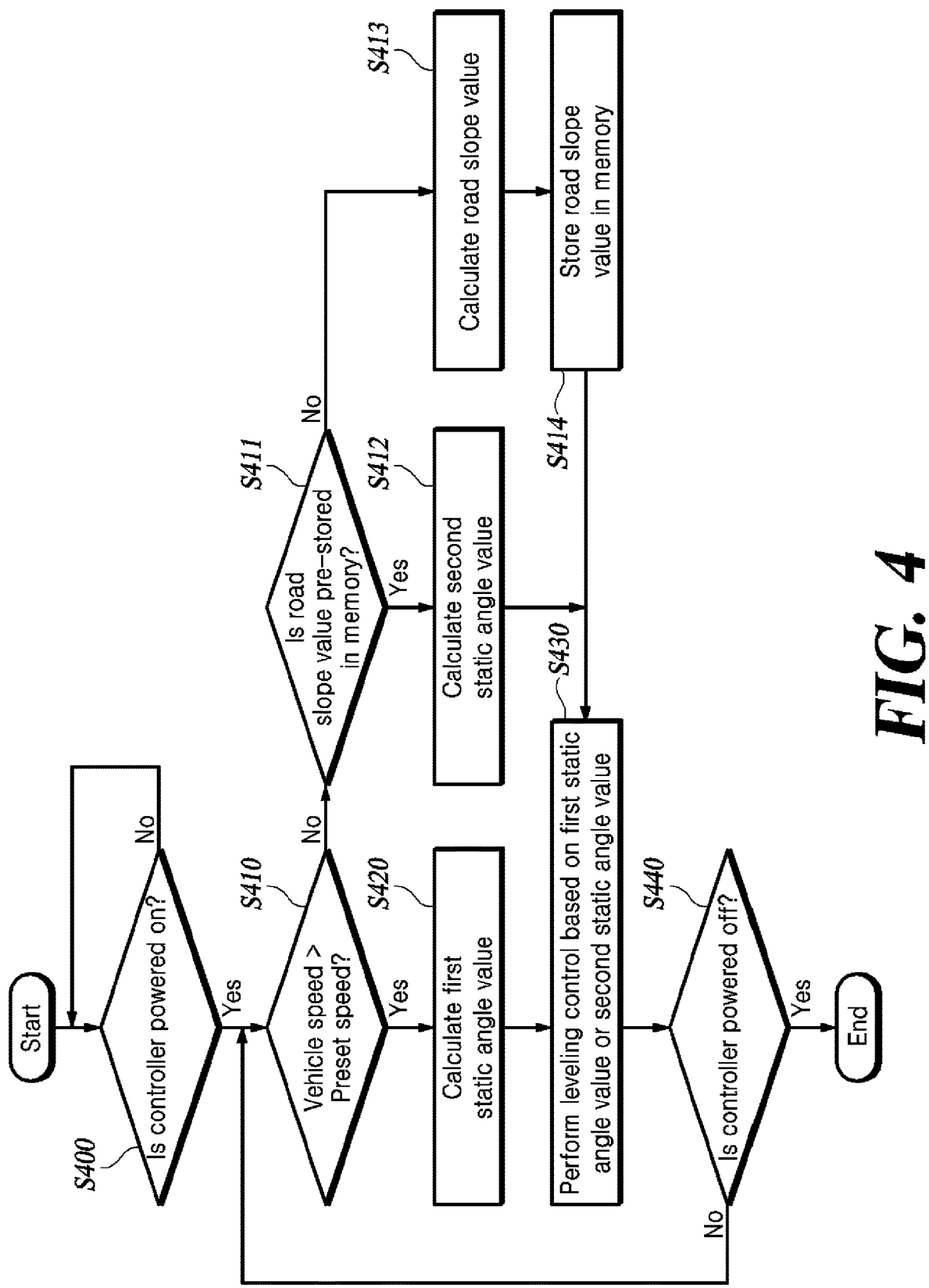
FIG. 4 is a flowchart of a leveling control method for a vehicle lamp according to an embodiment of the present disclosure.

FIG. 4 is a flowchart of a leveling control method for a vehicle lamp according to an embodiment of the present disclosure.

The flowchart of the present disclosure is an algorithm that is performed when the controller 40 is powered on; thus, this does not proceed when the controller 40 is not powered on in operation S400.

When the controller 40 is powered on, the controller 40 may determine whether the speed of the vehicle exceeds a preset speed in operation S410. This is a process of determining whether the vehicle is traveling or stopped, and the preset speed may generally be 0 km/h. The speed of the vehicle may be measured using the wheel speed sensor 20. Therefore, when the vehicle speed exceeds 0 km/h, it may be determined that the vehicle is traveling, and operation S420 may be performed. Otherwise, it may be determined that the vehicle is stopped, and operation S411 may be performed.

When it is determined that the speed of the vehicle exceeds the preset speed, the controller 40 may calculate a first static angle value in operation S420. A description of the method of calculating the first static angle value is provided in the description of FIGS. 2 and 3 and thus will be omitted hereinafter.

When it is determined that the vehicle speed is equal to or less than a preset speed, the controller 40 may determine whether a road slope value is pre-stored in memory in operation S411. When it is determined that the road slope value is pre-stored in memory, the controller 40 may calculate a second static angle value in operation S412. The second static angle value is a value obtained by subtracting the road slope value from an overall slope value measured using the acceleration sensor 10.

When it is determined that the road slope value is not stored in memory, the controller 40 may calculate a road slope value of the road on which the vehicle is currently positioned in operation S413. The road slope value may be a value obtained by subtracting the first static angle value from the overall slope value measured using the acceleration sensor 10. The calculated road slope value may be stored in memory in operation S414.

After completing any one of operations S420, S412, and S414, the controller 40 may perform leveling control based on the first static angle value or the second static angle value in operation S430. The leveling control may be performed such that the controller 40 controls an output of the driving unit 50 connected to the lamp 60 in order to adjust the light emission direction of the lamp 60 by calculating a light emission direction of the lamp 60 corresponding to the first static angle value or the second static angle value.

After performing operation S430, whether the controller is powered off may be determined in operation S440. When the controller is powered off, the algorithm ends, and when the controller is powered on, the process may go back to operation S410.

Figure 5:
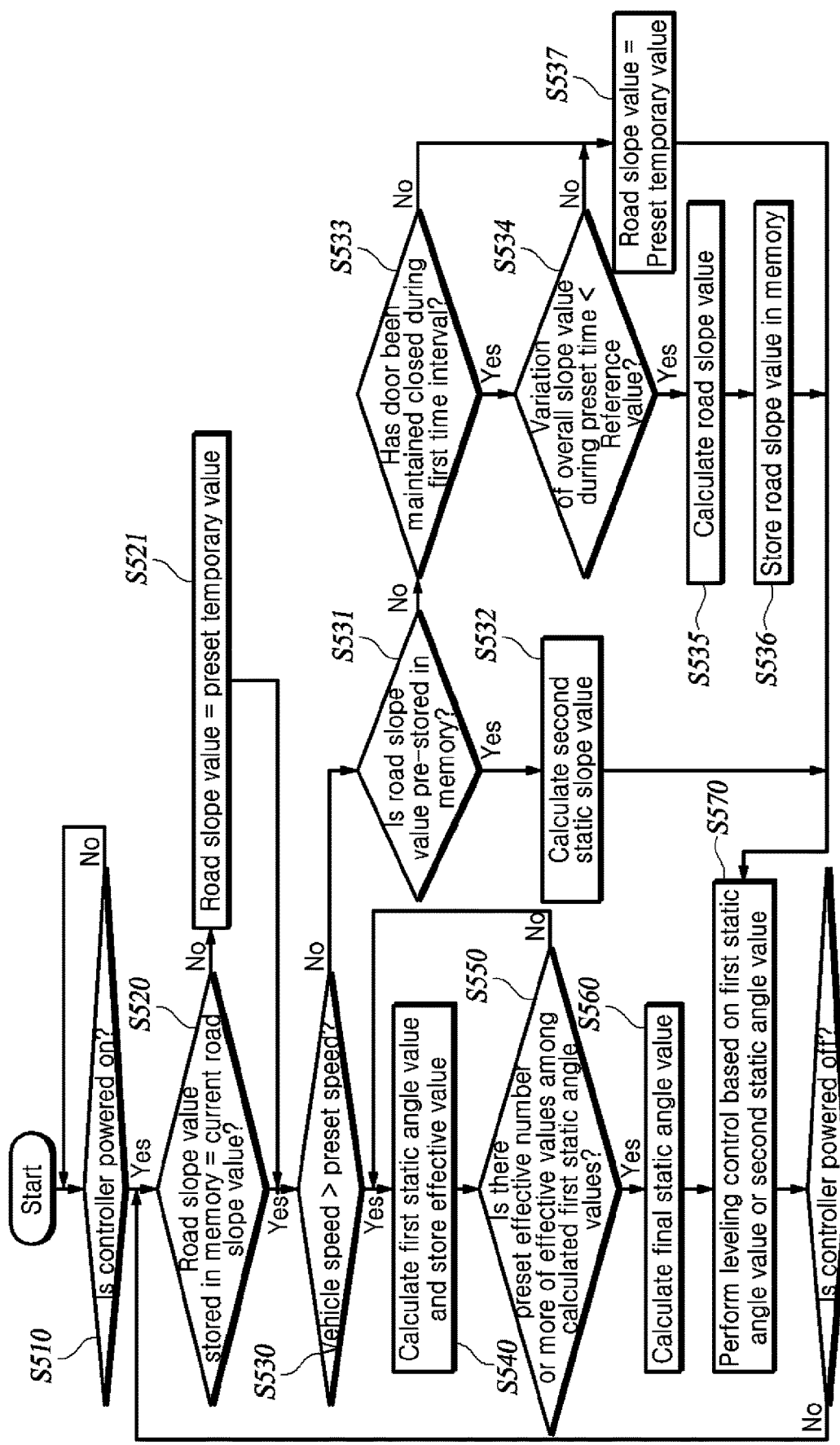
FIG. 5 is a flowchart of a leveling control method for a vehicle lamp according to another embodiment of the present disclosure.

FIG. 5 is a flowchart of a leveling control method for a vehicle lamp according to another embodiment of the present disclosure. The flowchart shown in FIG. 5 is an embodiment in which the embodiment of FIG. 4 is concreted and supplemented. Detailed descriptions of portions that overlap with those described in FIG. 4 will be omitted.

The flowchart of the present disclosure is an algorithm that is executed when the controller 40 is powered on; thus, it does not proceed when the controller 40 is not powered on in operation S510.

When the controller 40 is powered on, the controller 40 may determine whether a road slope value stored in memory is equal to a road slope value of a road on which a vehicle is currently positioned in operation S520. When there is a difference between those road slope values, the road slope value may be set to a preset temporary value, and then the process may go to operation S530 in operation S521. Here, the road slope value stored in memory and the current road slope value do not necessarily match, but it is enough if these values are similar within a tolerance range. The tolerance range may be set differently depending on the design.

When it is determined that the road slope value stored in memory is equal to the road slope value of the road on which the vehicle is currently positioned, the controller 40 may determine whether the speed of the vehicle exceeds a preset speed in operation S530.

When it is determined that the speed of the vehicle exceeds the preset speed, the controller 40 may calculate a first static angle value and store an effective value among first static angle values in memory in operation S540. The first static angle value may be calculated in a way the controller 40 calculates a dynamic angle value while in acceleration or deceleration during traveling of the vehicle and transforms the dynamic angle value using a transformation equation or a Look-Up Table (LUT). When the vehicle accelerates or decelerates over a preset threshold, it is not possible to accurately predict the first static angle value; thus, the first static angle value may be regarded as noise and thus not stored as an effective value. That is, when the acceleration or deceleration of the vehicle exceeds the preset threshold value while the vehicle travels, the controller 40 does not calculate the first static angle value. Even if calculating the first static angle value, the controller 40 does not include the first static angle value as an effective value. The controller 40 may calculate the first static angle value at a preset time interval while the vehicle travels.

The controller 40 may determine whether a preset number or more of effective values among the first static angle values is stored in operation S550. This is to increase the accuracy by predicting a static angle value using a plurality of effective values. When it is determined that the preset number or more of effective values is not stored, the controller 40 may go back to operation S540 and perform a process of calculating a first static angle value.

When it is determined that the preset number or more of effective values is stored, the controller 40 may calculate a final static angle value in operation S560. In this case, the final static angle value may be a median or average value of a plurality of first static angle values calculated. The final static angle value may be a different term that represents a value obtained by filtering a first static angle value.

When it is determined that the speed of the vehicle is equal to or less than a preset speed, the controller 40 may determine whether a road slope value is pre-stored in memory in operation S531. When it is determined that the road slope value is stored in memory, the controller 40 may calculate a second static angle value based on the road slope value in operation S532.

When it is determined that the road slope value is not stored in memory, the controller 40 may determine, using a door opening and closing sensor, whether a door closed state has been maintained during a preset first time interval in operation S533.

When it is determined that at least one door of the vehicle has not been closed during a first time interval, the controller 40 may set the road slope value to a preset temporary value and store the road slope value in memory in operation S537.

When it is determined that all the doors of the vehicle have been closed during the first time interval, the controller 40 may determine whether a variation of an overall slope value measured using the acceleration sensor 10 during a preset second time interval is less than a reference value in operation S534. When it is determined that the variation of the overall slope value during the second time interval is greater than or equal to the reference value, the controller 40 may set the road slope value to a preset temporary value and store the road slope value in memory in operation S537.

When it is determined that the variation of the overall slope value during the second time interval is less than the reference value, the controller 40 may calculate a road slope value in operation S535. The road slope value may be a value obtained by subtracting the first static angle value from the overall slope value measured using the acceleration sensor 10. The calculated road slope value may be stored in memory in operation S536.

After performing any one of operations S560, S532, S536, and S537, the controller 40 may perform leveling control based on the final static angle value or the second static angle value in operation S570. After completing the leveling control, whether the controller 40 is powered off may be determined in operation S580. When the controller 40 is not powered off, the algorithm may go back to operation S520. When the controller 40 is powered off, this algorithm ends.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A leveling control device for a vehicle lamp, the device comprising:
at least one acceleration sensor provided to detect acceleration of a vehicle in at least one direction;
a wheel speed sensor provided to detect a speed of a wheel of the vehicle;
a lamp provided to emit light to surroundings of the vehicle;
a driving unit connected to the lamp to adjust a direction of light emitted forward of the lamp; and
a controller configured to:
when the vehicle is traveling, calculate a dynamic angle value of the vehicle with respect to a road surface using the at least one acceleration sensor while the vehicle is in acceleration or deceleration, and calculate a first static angle value of the vehicle based on the dynamic angle value of the vehicle; and
when the vehicle is stopped, calculate a second static angle value of the vehicle using the at least one acceleration sensor and a road slope value of the road on which the vehicle is positioned, and control a direction of the light emitted forward of the lamp based on the first static angle value or the second static angle value,
wherein the controller is further configured to, when acceleration or deceleration of the vehicle exceeds a preset threshold while the vehicle travels, not calculate the first static angle value, and when the first static angle value is calculated, not include the first static angle value as an effective value, and
wherein the controller is further configured to:
calculate a first static angle value at each preset time interval;
when it is determined that an effective number or more of the first static angle values are included in the effective value, determine a median or average value of the measured first static angle values as the final static angle value; and control a direction of the light emitted forward of the lamp using the final static angle value.

2. The device of claim 1, wherein the road slope value is a difference between an overall slope value of the vehicle calculated using the at least one acceleration sensor and the first static angle value.

3. The device of claim 1, further comprising:
a getting on and off sensor configured to detect whether any person or object has gotten on or off the vehicle and transmit a detection signal to the controller.

4. The device of claim 3, the controller is further configured to:
while the vehicle is stopped, determine whether a road slope value is stored in memory;
when it is determined that the road slope value is not stored in memory, determine, using the getting on and off sensor, whether any person or object has gotten on or off the vehicle during a first time interval from a point in time when the vehicle started stopping to a current point in time when the controller is operating;
when it is determined that any person or object has not gotten on or off the vehicle during the first time interval, calculate a road slope value of a road on which the vehicle is positioned, and store the road slope value in memory; and
when it is determined that any person or object has gotten on or off the vehicle during the first time interval, set the road slope value to a preset temporary value and store the road slope value in memory.

5. The device of claim 4, wherein the controller is further configured to:
determine whether a road slope value calculated when the controller is powered on and a road slope value pre-stored in memory match each other; and
when the calculated road slope value and the road slope value pre-stored in memory do not match each other, set the road slope value to the preset temporary value and store the road slope value in memory.

6. A leveling control method for a vehicle lamp, the method comprising:
a driving state determining operation for determining whether a vehicle is traveling or stopped, using a wheel speed sensor;
a calculating operation for, when it is determined that the vehicle is traveling, calculating a dynamic angle value of the vehicle with respect to a road surface using an acceleration sensor while the vehicle is in acceleration or deceleration and calculating a first static angle value of the vehicle based on the dynamic angle value of the vehicle, and, while the vehicle is stopped, for calculating a second static angle value of the vehicle using the acceleration sensor and a road slope value of a road on which the vehicle is positioned, and controlling a direction of light emitted forward of the lamp based on the first static angle value or the second static angle value; and
a lamp adjusting operation of adjusting a position of light emitted from a lamp disposed at the vehicle based on the first static angle value or the second static angle value of the vehicle,
wherein, in the calculation operation,
when acceleration or deceleration of the vehicle exceeds a preset threshold while the vehicle travels, the first static angle value is not calculated, and when the first static angle value is calculated, the first static angle value is not included as an effective value, and
wherein, in the calculation operation,
the first static angle value is calculated at a preset time interval while the vehicle travels; and
when it is determined that a preset effective number or more of the first static angle values included as the effective values are measured, a median or average value of the measured first static angle values is determined as a final static angle value.

7. The method of claim 6, wherein a road slope value is a difference between an overall slope value of the vehicle calculated using the acceleration sensor and the first static angle value.

8. The method of claim 6, wherein the lamp adjustment operation further comprises controlling the direction of the light emitted forward of the lamp using the final static angle value.

9. The method of claim 6, wherein the calculating operation further comprises:
while the vehicle is stopped, prior to determining whether the road slope value is stored in memory,
an operation for determining whether the road slope value is stored in a memory;
an opening and closing detection operation for, when it is determined that the road slope value is not stored in memory, detecting, using a door opening and closing sensor, whether all doors of the vehicle have been maintained closed during a first time interval since a point in time when the vehicle started stopping to a current point in time when the controller is operating; and
a storage operation for, when it is determined that all doors of the vehicle have been maintained closed during the first time interval, calculating a road slope value of a road where the vehicle is positioned and storing the road slope value in memory, and, when it is determined that at least one of the doors of the vehicle has not been maintained closed during the first time interval, setting the road slope value to a preset temporary value and storing the road slope value in memory.

10. The method of claim 9, wherein the storage operation further comprises:
when it is determined that all the doors of the vehicle have been maintained closed during the first time interval, prior to calculating the road slope value,
determining whether a variation of an overall slope value of the vehicle during a preset second time interval is less than a reference value;
when it is determined that the variation of the overall slope value is less than the reference value, calculating the road slope value; and
when it is determined that the variation of the overall slope value is equal to or greater than the reference value, not calculating the road slope value and instead setting the road slope value to the preset temporary value and storing the road slope value in memory.

11. The method of claim 6, wherein the driving state determining operation comprises:
when the vehicle is traveling at a speed faster than a preset speed, determining that the vehicle is traveling; and
when the vehicle is traveling at a speed equal to or less than the preset speed, determining that the vehicle is stopped.

* * * * *